Feb. 28, 1928.

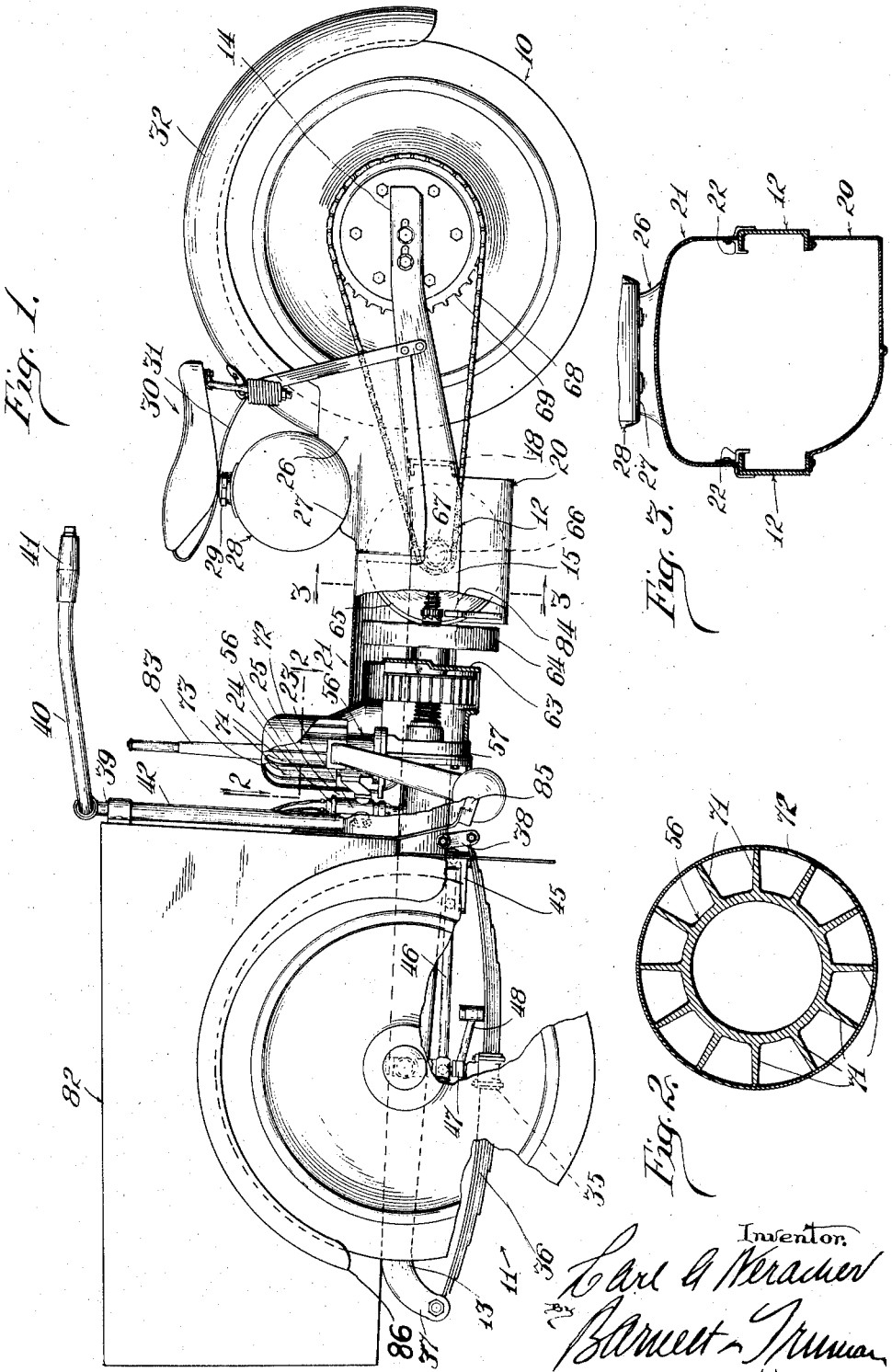

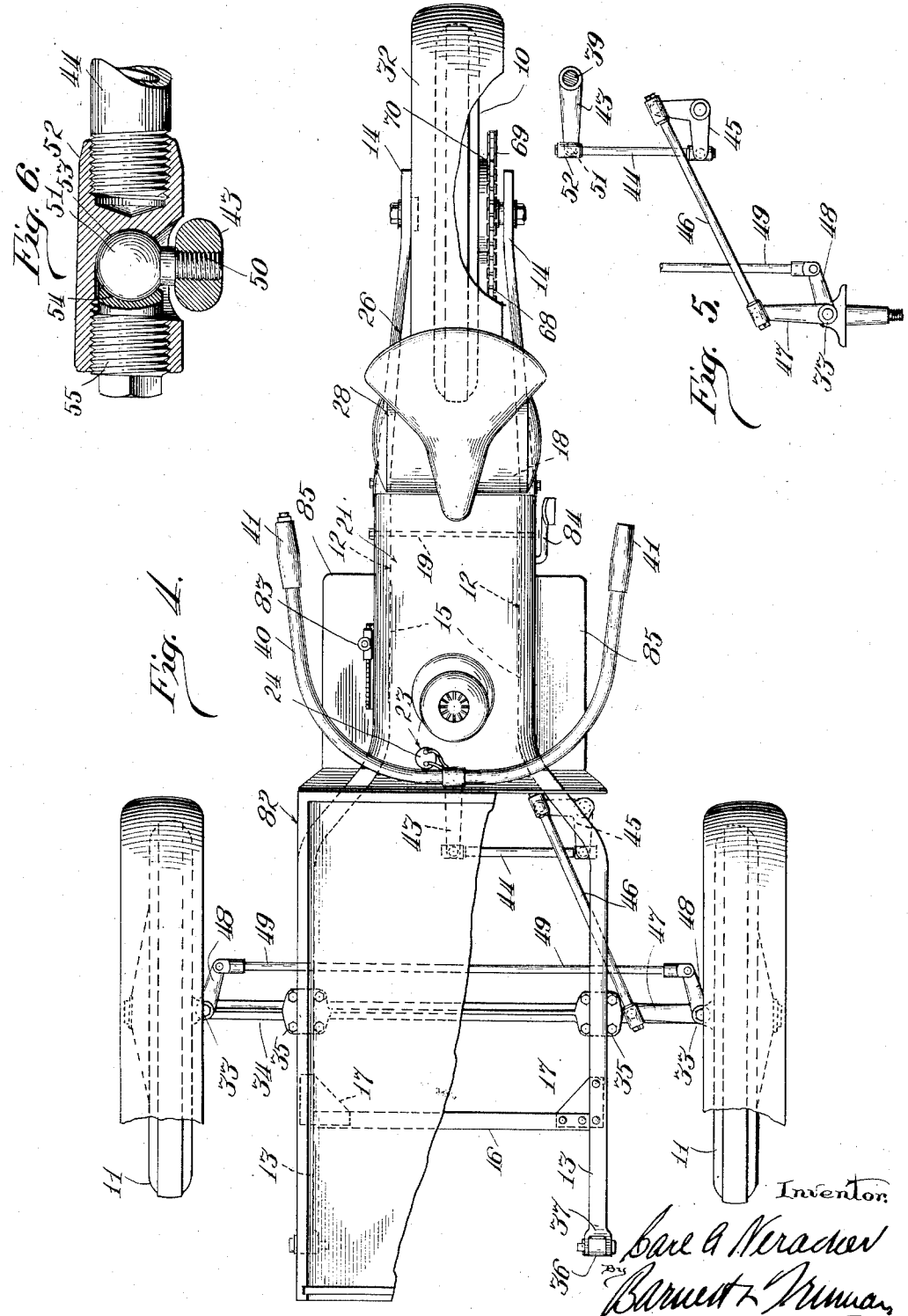

C. A. NERACHER

MOTOR VEHICLE

Filed June 8, 1921

Inventor.
Carl A. Neracher
by Barnett & Truman
Attorneys.

Patented Feb. 28, 1928.

1,660,880

UNITED STATES PATENT OFFICE.

CARL A. NERACHER, OF SYRACUSE, NEW YORK, ASSIGNOR TO NER-A-CAR CORPORATION, A CORPORATION OF NEW YORK.

MOTOR VEHICLE.

Application filed June 8, 1921. Serial No. 475,883.

My invention relates to a motor vehicle of the light or cycle type. One of the primary objects of the invention is to provide a new and improved three-wheeled motorcycle, having a single rear driving wheel and a pair of front steering wheels, which will be light, strong, easily controlled, relatively inexpensive to manufacture and so constructed that the driver when operating the machine is protected against mud, dust, oil and grease.

Another object of the invention is to provide a motorcycle, either of the three wheeled or the two wheeled type, with effective means for cooling the motor.

The invention consists in the new and improved constructions, arrangements and devices to be hereinafter described and claimed for carrying out the above stated objects and such other incidental objects as will be mentioned in the following description of the preferred form of the invention shown in the drawings appended hereto.

In the drawings,

Fig. 1 is a side elevation, with parts in section, of a three-wheeled motorcycle constructed in accordance with this invention.

Fig. 2 is a sectional plan taken on line 2—2 of Fig. 1.

Fig. 3 is a vertical sectional view on line 3—3 of Fig. 1.

Fig. 4 is a plan view of the machine, with certain parts broken away.

Fig. 5 is a diagrammatic view, illustrating the link mechanism for steering the motorcycle.

Fig. 6 is a detail, longitudinal sectional view of one of the connecting devices for articulating the links of the steering mechanism.

Figure 7:
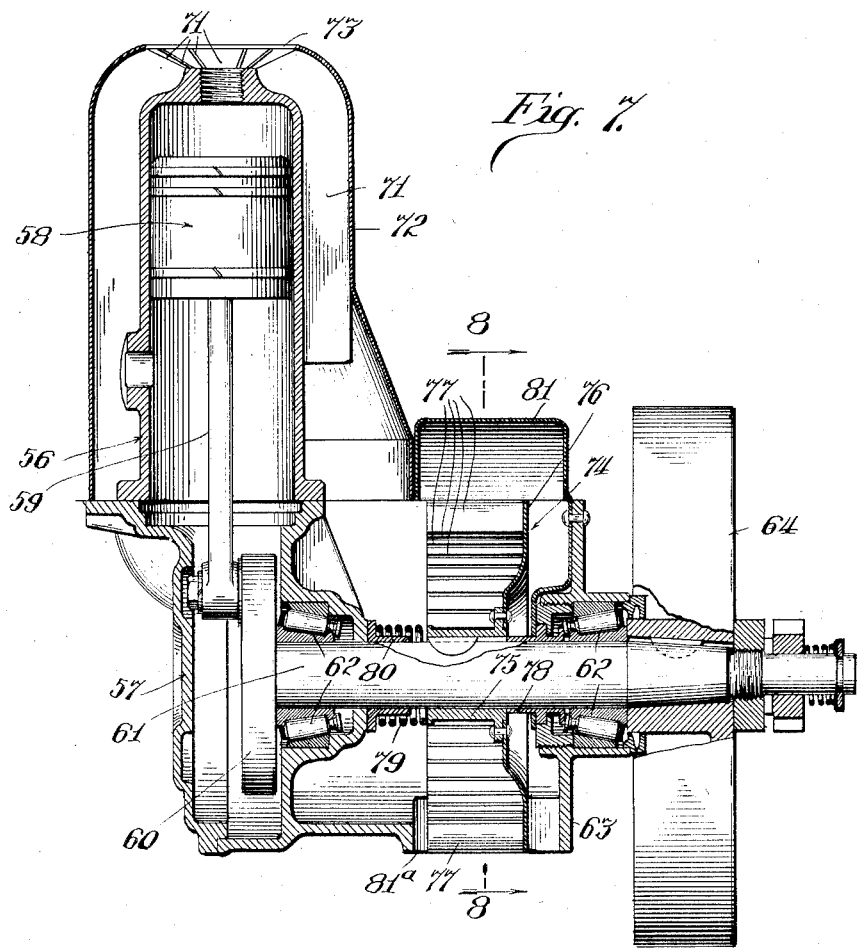
Fig. 7 is a longitudinal sectional view illustrating the construction and arrangement of the motor and of the fan for cooling the motor.
Figure 8:
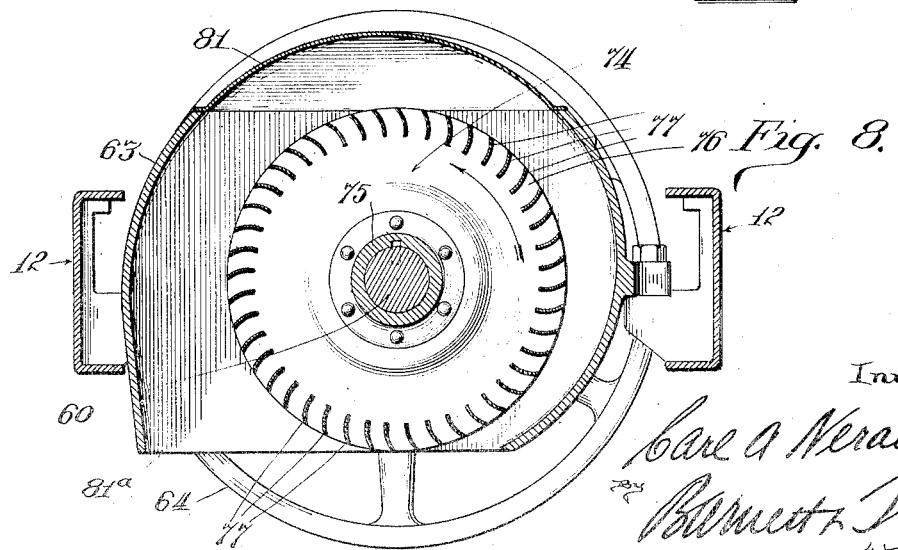
Fig. 8 is a sectional view on line 8—8 of Fig. 7.

Referring to the drawings, 10 designates the rear driving wheel of the motorcycle and 11, 11 the front steering wheels.

The frame of the vehicle is constructed preferably of pressed steel parts as follows:

The numerals 12 designate a pair of pressed steel side frame members which are channel-shaped in cross section and are bent so that the forward portions 13 of the same stand at a considerable distance apart, the rear portions 14 relatively close together for convenience in mounting the rear wheel, and the intermediate portions 15 wider apart than the rear portions 14 but with less spread than the front portions 13, the spread of the frame at the reach between the wheels being preferably such that this part of the machine may be conveniently straddled by the driver in starting the motor. The side frame members 12 are braced by a forward transverse member 16, preferably a channel bar, the ends of which are seated in the channels of the side frame members, these connections being reinforced by gussets 17, a rear transverse member 18 located a short distance in front of the rear wheel, and a transverse tension rod 19. Arranged under the side frame members and, preferably rigidly connected therewith, is a lower housing member or pan 20. 21 designates an upper housing member which is preferably removable and provided with clips 22 to engage the side frame members 12. The upper housing member is kept in place in any suitable manner, for example the carburetor designated 23 may be provided with a removable cap piece 24 which is adapted to be screwed down so as to bear against an upstanding lip 25 on member 21 around the opening through which the carburetor projects. 26 is a rear housing member, also of pressed steel, having its lower edges overlapping and secured to the side frame members. The arrangement just described provides a housing or casing for the driving and transmission mechanisms of the motorcycle which serves to protect the driver from oil and grease. The rear housing member 26 is formed with a recess or cradle 27 on its upper surface in which recess is seated a fuel tank 28 having a filling opening in the top closed by a screw cap 29. The saddle 30 is supported on a leaf spring 31 which bears on cap 29, the saddle being pivotally connected with the rear mud guard 32 so that the front end of the saddle may be raised to give access to the fuel tank for filling the latter.

The arrangement of the saddle and fuel tank is not claimed herein, constituting part of the subject matter of co-pending applications filed by me on October 21, 1919, Serial No. 332,243, and on June 27, 1921, Serial No. 480,770.

The rear mud guard 32 fits into the housing member 26, its lower end being secured to the rear transverse frame member 18.

The front wheels 11 are mounted on steering knuckles 33 pivoted at the opposite ends of a front, downwardly bowed axle 34. The axle is secured by means of spring clips 35 to a pair of semi-elliptical springs 36 associated with the forward reaches 13 of the side frame members. The spring is pivotally connected to the forked downturned end 37 of the frame member and is connected at its other end to said frame member by means of a shackle 38.

39 is a substantially upright steering post provided preferably with a handle bar 40 having hand grips 41. The steering post is arranged in a casing 42 rigidly connected with the framework of the motorcycle. A link mechanism connects the steering knuckles 33 with the lower end of the steering post, this mechanism being so constructed that when the steering post is turned in one direction both of the front steering wheels 12 are turned in the same direction. The link mechanism is composed of the following parts: 44 is a link connecting arm 43 with one arm of a bell crank 45 pivoted to one of the frame members 13, and 46 is a link connecting the other arm of the bell crank to a rigid arm 47 on one of the steering knuckles 33. Both steering knuckles are provided with rigid arms 48 which are connected by a link 49. The links 44, 46 are articulated with the parts they connect by ball and socket devices, one of which is detailed in Fig. 6. The arm 43, as shown in Fig. 6, has secured to its forward end a stud 50 having a spherical head or ball 51 adapted to enter a casing member 52 on link 44, the ball being held between a curved surface 53 on the interior of the casing member and the curved surface 54 on a plug 55 which is screwed into the end of the casing member.

In its general features the driving mechanism of the motorcycle is substantially the same as that described and claimed in my co-pending application Serial No. 491,781 filed August 12, 1921. The motive power is supplied by an internal combustion engine, preferably a one-cylinder engine of the two cycle type. The power generated by the engine is transmitted to the rear driving wheel by means of a friction disc transmission and a sprocket chain (a shaft drive might be substituted for the sprocket chain) the friction discs being constructed and arranged so that one of the discs is brought to bear against the other or separated from the other to connect or disconnect the motor from the driving wheel, obviating the necessity for a clutch, and so that one disk may be set to different distances from the center of the other disc for varying the speed at which the motorcycle is propelled.

In the drawings, 56 indicates the cylinder of the motor, 57 the crank casing, 58 the piston and 59 the connecting rod between the piston and a disc 60 constituting the crank of crank shaft 61. The crank shaft is mounted in bearings 62 arranged in a housing 63 preferably cast integral with the crank casing 57. The fly wheel 64 of the engine forms one of the members of the friction disc transmission, the other member of which is designated 65 and is arranged on a shaft 66 provided with a sprocket 67 for the drive chain 68, the latter extending around a sprocket 69 of larger diameter associated with the hub 70 of the rear wheel 10.

The parts of the driving mechanism as above described are not claimed herein, being the subject matter of my aforesaid co-pending application Serial No. 491,781.

The cylinder 56 is formed preferably with a plurality of longitudinally disposed cooling fins 71 (Figs. 2 and 7) and is enclosed by a sheet metal hood 72 provided with an air induction opening 73 in its upper end. Splined to the crank shaft 61 is a fan 74 preferably of the sirocco type, consisting of a hub 75, a disc 76 and curved fan blades 77 secured to the disc. The hub of the fan is held against a bushing 78 by means of a coiled spring 79 bearing against the flange of a bushing 80. The fan is located in the housing member 63 above referred to, the top of which is closed by a cover plate 81. The housing has an opening 81ᵃ in the bottom. When the motor is in operation air is drawn by rotation of the fan into the hood 72 surrounding the cylinder through opening 73 and by passing along the spaces between fins 71 keeps the cylinder cool, the air being ejected through opening 81ᵃ.

The air cooling means just described might be used in connection with the motor employed for driving the two-wheeled motorcycles shown and described in my co-pending application above referred to, but it has particular utility in connection with a three-wheeled motorcycle of the type herein shown if, as is contemplated, the front portion of the frame of the machine is used for supporting a box or seat, or the like (in the drawings a box 82 is shown) since any such arrangement as this obstructs to a considerable extent the natural draft over the motor cylinder.

In the drawing, 83 designates a lever for controlling the speed of the motorcycle. 84 (Fig. 4) is the foot lever of a kick starter for turning over the motor in starting. The friction discs are brought together and separated by the rotation of one of the hand grips 41 on handle bar 40. As these controlling mechanisms are not claimed herein, being the subject matter of the aforesaid copending application Serial No. 491,781, it has been thought sufficient to merely make mention of the function and purpose of the parts enumerated.

It will be seen that the driver may straddle the middle portion of the frame in starting the motor. The frame is arranged at substantially the wheel centers to make this possible and so that the motorcycle will have the stability resulting from the location at a low level of the motor and transmission mechanism. When the motor has been started the driver mounts the saddle, sets the speed control lever to a slow speed position and then brings the movable disk 65 against the friction surface provided on the fly wheel 64. When the vehicle is under way its speed may, if desired, be increased by manipulation of lever 83. In driving the machine the rider places his feet on the inclined foot boards 85 secured to opposite sides of the frame.

The front wheels may be provided with mud-guards 86 which are arranged to turn with the steering movements of the wheels.

I claim:

1. A motor vehicle of the motorcycle type, comprising a single rear driving wheel, a pair of front steering wheels, a pair of pressed steel side frame members channel-shaped in cross section arranged close together at the back wheel, spread wider apart between the wheels and having their forward ends arranged at a still greater distance from each other, a pair of semi-elliptical springs connected to the forward portions of the frame members, respectively, shackles connecting the other ends of the springs to said frame members, a lower housing member extending across the intermediate portions of the side frame members, an upper housing member removably connected with said side frame members, a rear housing member rigid with said frame members, a substantially upright steering post provided with a handle bar at its upper end and with an arm at its lower end, a bell crank on one of said side frame members, a front axle supported on said springs, steering knuckles for the front wheels on said axle, an arm on one of said steering knuckles, links connecting said bell crank with the arm on the steering knuckle and the arm on the steering post, respectively, and a link connecting said steering knuckles to effect the turning of one when the other is turned.

2. A motor vehicle of the motorcycle type comprising in combination with the wheels of the vehicle, a substantially horizontal frame at substantially the wheel center, said frame comprising two side members narrowed at the rear end and spread at the front end, semi-elliptic springs at the front of said frame fastened at one end to the front end of said frame and at the rear end by shackles secured to said frame members, a front axle secured to said springs, knuckles at each end of said axle, wheels associated with said knuckles, a steering handle, link connections between said handle and one of said knuckles and a reach rod connecting said knuckles transversely of said frame whereby said front wheels may be turned together by said handle, an internal combustion engine on said frame back of the front wheels, an engine shaft carrying a fly wheel, a fan on said shaft between the cylinder of said engine and said fly wheel, a casing surrounding said cylinder and fan, said casing having openings therein for admission and discharge of air, said cylinder, casing and fan being arranged in such manner that air circulation is induced along said cylinder solely by said fan, and another casing on said frame inclosing the transmission element of said vehicle and parts of said first casing.

3. A three wheeled motor vehicle comprising in combination a pair of front steering wheels, a single rear driving wheel, a frame having a relatively narrow spread near the middle of the vehicle, a load-carrier mounted on the frame between the front wheels, a hollow casing carried by and extending from side to side of the frame at substantially the level of the wheel centers for enclosing the driving mechanism of the vehicle, a mud-guard over the rear wheel and a seat arranged in front of the mud-guard.

4. A three wheeled motor vehicle comprising in combination a pair of front steering wheels, a single rear driving wheel, a frame having a relatively narrow spread near the middle of the vehicle, a load-carrier mounted on the frame between the front wheels, a hollow casing carried by and extending from side to side of the frame at substantially the level of the front wheel centers for housing the driving mechanism of the vehicle, a mud-guard secured to said housing and extending over the rear wheel, a seat arranged in front of the mud-guard, and a fuel tank mounted on said housing under said seat.

5. A three wheeled motor vehicle comprising a single rear driving wheel, a pair of front steering wheels, and a pair of side frame members joined in such arrangement that they are close together at their rear ends adjacent the sides of the rear wheel, spread wide apart at the front ends between the front wheels, and with their intermediate portions substantially parallel and at a distance apart which is less than that of the front ends to permit the operator to straddle this portion of the frame, and driving mechanism positioned between that portion of the frame members adapted to be straddled by the operator.

6. A three wheeled motor vehicle comprising a single rear driving wheel, a pair of front steering wheels, and a pair of side frame members joined in such arrangement that they are close together at their rear ends adjacent the sides of the rear wheel, spread apart at the front ends between the front wheels, and with their intermediate portions substantially parallel and at a distance apart which is less than that of the front ends to permit the operator to straddle this portion of the frame, but greater than the rear ends to accommodate driving mechanism which extends longitudinally of the frame between the side members, and upper housing members covering all three portions of the frame and secured thereto, the housing structure being at all points of substantially the same width as the spread of the frame members at that point.

7. A three wheeled motor vehicle comprising a single rear driving wheel, a pair of front steering wheels, and a pair of side frame members joined in such arrangement that they are close together at their rear ends adjacent the sides of the rear wheel, spread wide apart at the front ends between the front wheels, and with their intermediate portions substantially parallel and at a distance apart which is less than that of the front ends to permit the operator to straddle this portion of the frame, but greater than the rear ends to accommodate driving mechanism which extends longitudinally of the frame between the side members, a load-carrying receptacle secured to and covering the space between the wide spread front ends of the frame, a housing for the driving mechanism enclosing the space between the intermediate portions of the frame, and a mud-guard covering the rear end portions of the frame.

8. A three wheeled motor vehicle comprising a single rear driving wheel, a pair of front steering wheels, axles for the wheels, and a pair of side frames suitably connected, and supporting the axles, the rear ends of the frames being close together and bracketing the sides of the rear wheel, the front ends spread wider apart and adjacent the inner sides of the front wheels, and the middle portion of the frame being relatively narrow so as to be straddled by the operator, and a housing structure carried by the frame members and covering all of the space between these members, the central portion of this housing being removable.

9. A three wheeled motor vehicle comprising a pair of front steering wheels, a single rear driving wheel, driving mechanism, a frame structure including a central housing for the driving mechanism and adapted to be straddled by the operator, a wider load-carrying structure between the front wheels, a seat for the operator carried adjacent the rear wheel, and a pair of foot rests, one positioned at either side of the central housing and behind the load carrying structure, the over-all width of the housing and foot-rests being no greater than the width of the load-carrying structure.

10. A three wheeled motor vehicle comprising a pair of front steering wheels, a single rear driving wheel, driving mechanism, a frame structure including a central housing for the driving mechanism, and a wider and higher load-carrying structure between the front wheels, whereby the operator may straddle the central housing and be substantially shielded at the front by the load carrying structure.

11. A motor vehicle comprising a single rear driving wheel, a pair of front steering wheels, a pair of side frame members having substantially parallel front portions spaced wide apart between the front wheels, intermediate substantially parallel portions spaced closer together, and rear portions spaced still more closely at the sides of the rear wheel, longitudinally extending semi-elliptical springs connected at their ends beneath the ends of the front portions of the frame members, an axle for the front wheels carried by the springs, and an engine assembly for driving the rear wheel mounted between the intermediate portions of the frame members.

12. A motor vehicle comprising a single rear driving wheel, a pair of front steering wheels, a pair of side frame members having substantially parallel front portions spaced wide apart between the front wheels, intermediate substantially parallel portions spaced closer together to permit the operator to straddle this portion of the frame, and rear portions spaced still more closely at the sides of the rear wheel, longitudinally extending semi-elliptical springs connected at their ends beneath the ends of the front portions of the frame members, an axle for the front wheels carried by the springs, a load carrying structure mounted above the front portions of the frame members, and an engine assembly for driving the rear wheel mounted between the intermediate portions of the frame, a mud guard carried by the frame and covering the rear wheel, and a housing for the engine covering all portions of the space between the frame-members between the mud-guard and the load carrying structure, the upper portion of this housing being removable to give access to the engine.

13. A three wheeled motor vehicle comprising a single rear driving wheel, a pair of front steering wheels, a pair of deep channel side frame members at substantially the wheel centers and spaced wide apart between the front wheels and adapted to be straddled by the operator and close together at the sides of the rear wheels, a load carrying structure mounted above the front frame portions, a seat for the operator mounted above the rear frame portions, and driving mechanism mounted between the intermediate frame portions and extending longitudinally of the frame, and a housing for the driving mechanism carried by the intermediate frame portions, the space thereabove, and between the load carrying structure and seat being unobstructed.

14. A three wheeled motor vehicle comprising a single rear driving wheel, a pair of front steering wheels, a pair of side frame members suitably connected, and spread apart between the front wheels and positioned close together at the sides of the rear wheel, longitudinally extending springs mounted beneath the front portions of the side frames, a non-rotary front axle carried by these springs, upwardly extending steering knuckles mounted at the ends of this axle, at the upper ends of which knuckles the front wheels are pivoted, the side frames sloping downwardly from their front ends to a point between the front and rear wheels, and then upwardly to the axis of the rear wheel, whereby the center of gravity of the mechanism carried between the intermediate portion of the frames is lowered to the wheel centers.

CARL A. NERACHER.